United States Patent [19]
Arroyo et al.

[11] Patent Number: 5,321,788
[45] Date of Patent: Jun. 14, 1994

[54] OPTICAL FIBER CABLE WHICH INCLUDES WATERBLOCKING AND FREEZE PREVENTING PROVISIONS

[75] Inventors: Candido J. Arroyo, Lithonia; James R. Petisce, Norcross; Jim J. Sheu, Dunwoody, all of Ga.

[73] Assignee: AT&T Bell Laboratories, Murray Hill, N.J.

[21] Appl. No.: 906,157

[22] Filed: Jun. 29, 1992

[51] Int. Cl.⁵ .............................. G02B 6/44
[52] U.S. Cl. .............................. 385/109
[58] Field of Search ............... 252/70, 73, 75; 385/100, 101, 102, 103, 104, 105, 106, 107, 108, 109, 110, 111, 112, 113, 114

[56] References Cited

U.S. PATENT DOCUMENTS

| | | | |
|---|---|---|---|
| 3,425,971 | 2/1969 | Gugliemeill et al. | 260/17.4 |
| 4,002,819 | 1/1977 | Woytiuk | 174/23 |
| 4,176,240 | 11/1979 | Sabia | 174/23 |
| 4,802,732 | 2/1989 | Kufuma et al. | 395/114 |
| 4,946,237 | 8/1990 | Arroyo et al. | 385/107 |
| 5,020,875 | 6/1991 | Arroyo et al. | 350/96.23 |
| 5,138,685 | 8/1992 | Arroyo et al. | 385/109 |

OTHER PUBLICATIONS

Djock, et al., "Review of Synthetic and Starch-Graft Copolymer Superabsorbents," Absorbents Products Conf., Nov. 16–17, 1983.

Primary Examiner—Rodney B. Bovernick
Assistant Examiner—John Ngo
Attorney, Agent, or Firm—Edward W. Somers; Donald E. Hayes, Jr.

[57] ABSTRACT

An optical fiber cable (20) includes provisions in a core thereof for preventing the flow of water longitudinally along the core and for preventing freezing of such water. The provisions for preventing freezing of water within the core, which could effect adversely the optical fibers, includes an antifreeze material. Each of two tapes may be impregnated with an antifreeze material such as propylene glycol, for example, and used to provide a laminate with a superabsorbent powder therebetween. Advantageously, the cable may have suitable flame retardance so that it may extend from an outside manhole to distribution points within a building.

19 Claims, 3 Drawing Sheets

OPTICAL FIBER CABLE WHICH INCLUDES WATERBLOCKING AND FREEZE PREVENTING PROVISIONS

TECHNICAL FIELD

This invention relates to an optical fiber cable which includes waterblocking and freeze preventing provisions. More particularly, this invention relates to an optical fiber cable which includes provisions in a core thereof for blocking water flow longitudinally along the cable, for preventing the freezing of any water in the cable and for preventing flame and smoke spread.

BACKGROUND OF THE INVENTION

In the cable industry, it is well known that changes in ambient conditions lead to differences in water vapor pressure between the inside and the outside of a plastic cable jacket. This generally operates to diffuse moisture from the outside of the cable to the inside of the cable. Eventually, this will lead to an undesirably high moisture level inside a core of the cable, especially if a plastic jacket is the only barrier to the ingress of the moisture. High levels of condensed moisture inside a cable core may have a detrimental effect on the transmission characteristics of an optical fiber cable and a metallic conductor cable.

Furthermore, water may enter the cable because of damage to the cable which compromises its integrity. For example, lightning and rodent attacks or mechanical impacts may cause openings in the sheath system of the cable to occur, allowing water to enter and, if not controlled, to move longitudinally along the cable into splice closures, for example.

Cables for transmitting communications signals must meet industry standards with respect to waterblocking provisions. For example, one industry standard requires that there be no transmission of water under a pressure head of one meter in one hour through a one meter length of cable.

In the prior art, various techniques have been used to prevent the ingress of water through the sheath system of a cable and along the core. For example, a metallic shield which often times is used to protect a metallic conductor cable against lightning and rodent attacks is provided with a sealed longitudinal seam.

Because lightning strikes may cause holes in a metallic shield, it is not uncommon to include additional provisions for preventing the ingress of water into the core. Waterblocking materials have been used to fill cable cores and to coat portions of cable sheath systems to prevent the movement longitudinally thereof of any water which enters the cable. See U.S. Pat. No. 4,176,240 which issued on Nov. 27, 1979, in the name of R. A. Sabia. The use of a filling material, in the form of a grease, causes housekeeping problems, inhibits line speeds because of the need to fill carefully interstices of the cable core, and presents problems for field personnel during splicing operations, for example.

Also, some filling materials have adversely affected the mutual capacitance of the core. This problem has been overcome by a filling material comprising a mixture of a hydrophobic powder in the form of water repellent treated calcium carbonate and a hydrophilic powder in the form of at least one high molecular weight resin rapidly hydratable to form a viscous solution. See U.S. Pat. No. 4,002,819.

Waterblocking provisions inside the core may be other than a filling material. See U.S. Pat. No. 4,946,237 which issued on Aug. 7, 1990 in the names of C. J. Arroyo and P. F. Gagen. A longitudinally extending waterblocking member inside a core tube may take several forms. For example, it may comprise a laminate comprising a powder captured between two tapes. Or, it may comprise a substrate tape which is impregnated with a material. When exposed to water, the impregnating material reacts to swell and causes the tape to prevent the passage of water through the sheath system toward the core and its migration in a direction longitudinally along the cable. In one embodiment, the impregnating material comprises a film of a water swelling or so-called superabsorbent material. In another embodiment, a tape may be treated with a paste comprising a superabsorbent material. The impregnating material may be a polyacrylic acid having a saponification in a relatively wide range or it may be a polyacrylamide. Also, the impregnating material may comprise blends or salts of polyacrylic acid or polyacrylamide, or copolymers or derivatives of the acrylic acid and the acrylamide. Further, the waterblocking provisions within the core may comprise one or more yarns which have been impregnated with a superabsorbent material or which comprise superabsorbent fibers. Also, the waterblocking provisions in the core may comprise a waterblocking tape, which may engage an inner surface of the core tube, and a waterblocking yarn or yarns.

Lately, optical fiber cables have made great inroads into the communications cable market. Although the presence of water within an optical cable may not be detrimental to the performance of optical fibers of the cable, passage of the water within the cable should be prevented as its presence at connection points or terminals may cause problems. For example, the formation of and retention of ice around the optical fibers provide a microbending crushing effect which is known to increase undesirably the attenuation. Thus, protective sheaths must also be water impermeable to prevent or minimize ingress of water. However, even when efforts are made to prevent water ingress, sheath damage may provide pathways for water into cable and upon freezing, attenuation problems will still result. Thoughts have been given, therefore, to the provision of means which will prevent the crushing action of ice upon optical fiber, but to date solutions to the problem have not met with wide acceptance.

Another problem relates to the use of riser cables which connect interoffice and intercity trunks. Such cables include portions which provide vertical riser distribution between two or more floors of a building. Typically indoor optical fiber cables are all air core while outdoor cables include filling materials in the core to provide resistance to water penetration. Desirably, the use of one cable to extend from an outside manhole into a building and upon a riser shaft would result in substantial cost savings because of the elimination of the need for additional splice locations. In order to use one length of cable to extend from a splice location in a manhole outside a building into the building and then to distribution points, the cable must include suitable waterblocking and freeze prevention provisions to satisfy outside requirements which do not compromise the fire retardance properties of the cable needed for internal building use.

Cable manufacturers have resorted to the use of superabsorbent materials which provide the desired resistance to water penetration while not degrading the flame resistance of the cable. As mentioned hereinbefore, in some cables, superabsorbent tapes have been disposed inside the cable core. It has been found that the use of a superabsorbent tape in an optical fiber cable core may result in an increased microbending loss in the fibers because of freezing of the activated superabsorbent gel.

What is needed and seemingly what is not available is an optical fiber cable which includes protection against the flow of water along the cable and which includes provisions for protecting the optical fibers against a freezing environment. Also desirable is a cable which has sufficient flame retardance so that the cable may be used inside buildings such as in risers, for example.

SUMMARY OF THE INVENTION

The foregoing problems of the prior art have been overcome by cables of this invention. An optical fiber cable includes a core comprising at least one optical fiber transmission medium, a tubular member in which is disposed the core and which is made of a plastic material and a sheath system which is disposed about the tubular member. Means are disposed in the tubular member for preventing freezing of water within the cable, the means including a superabsorbent material and an antifreeze material, both materials preferably being disposed in one longitudinally extending member.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
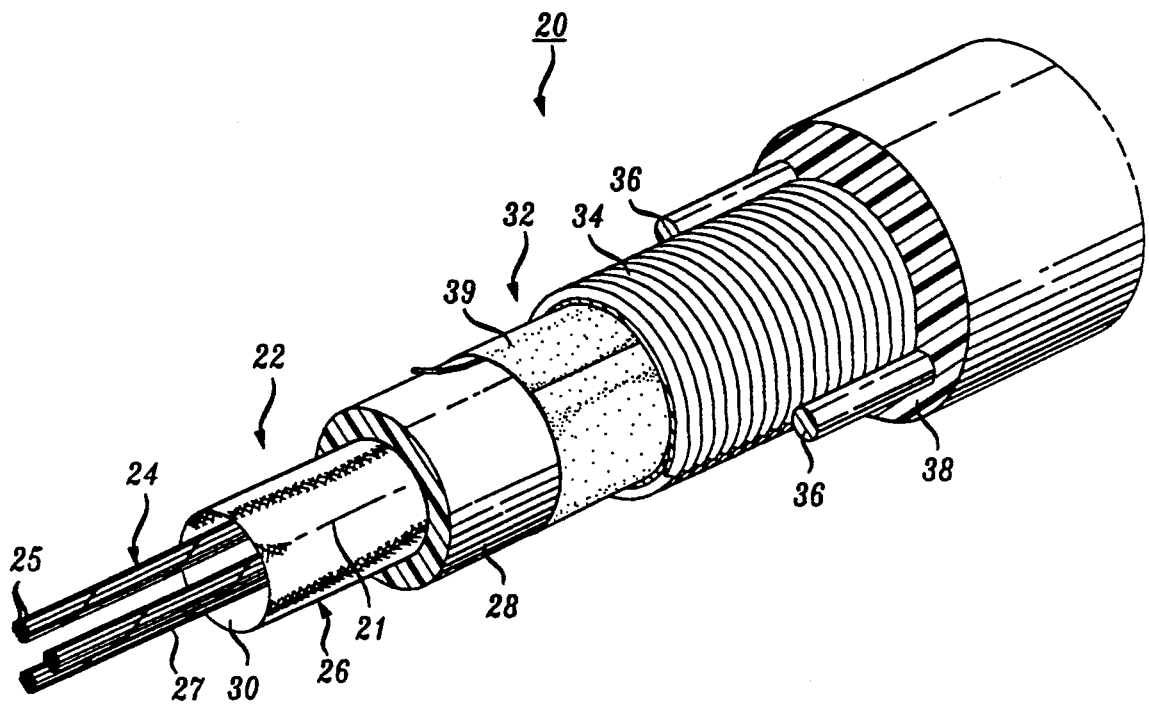
FIG. 1 is a perspective view of a cable having a core which includes provisions for blocking the flow and preventing the freezing of water.
Figure 2:
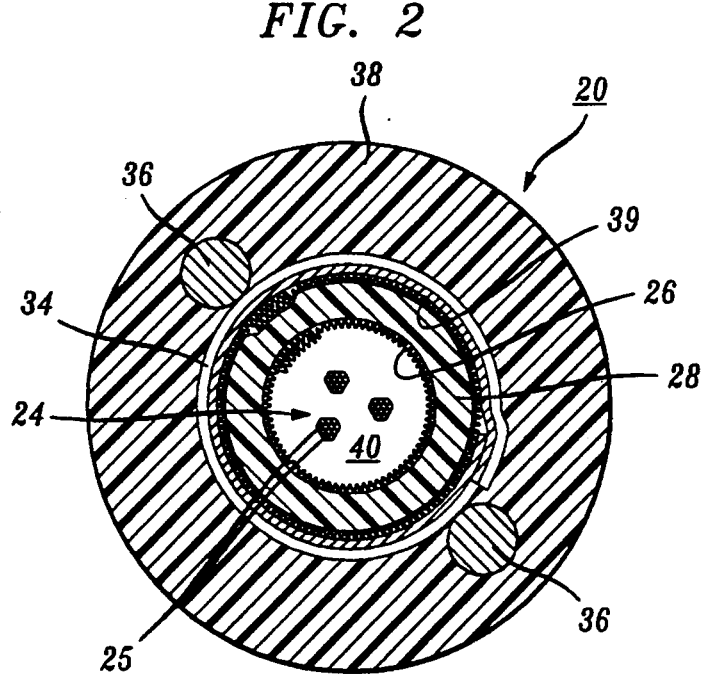
FIG. 2 is an end sectional view of the cable of FIG. 1.

Referring now to FIGS. 1 and 2, there is shown a communications cable which is designated generally with the numeral 20 and which has a longitudinal axis 21. It includes a core 22 comprising one or more units 24—24 of optical fibers 25—25 which may be buffered with an outer layer of polyvinyl chloride (PVC), for example. Each of the units 24—24 is wrapped with a binder ribbon 27. The core 22 includes a waterblocking member 26 which is disposed within a tubular member 28 referred to as a core tube of a sheath system 32. In the embodiment shown, the waterblocking member 26 is tubular and disposed adjacent to the core tube 28.

The waterblocking member 26 in one embodiment is in the form of a tape 30 which may comprise a substrate tape which may be made of a hydrophobic material and which has been treated with a suitable material. Advantageously, the tape is hydrophilic. A hydrophilic material is one that has a strong affinity for water in that it absorbs water easily. As can be seen, the tape 30 has been wrapped about the units 24—24 in a manner which may or may not include an overlapped seam.

The core tube 28 is enclosed by a metallic shield 34 and an outer plastic jacket 38. The sheath system 32 also includes two diametrically opposed strength members 36—36. Also, an additional tape 39 may be wrapped about an outer surface of the core tube 28. The tape 39 is a waterblocking tape which may include the same substrate as the tape 30.

In one embodiment, the tape 30 is a spunbonded nonwoven polyester material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material which has the capability of maintaining its shape in the presence of the temperatures encountered during the extrusion of the core tube 28. The fibers of the web structure are arranged so that air cells or pockets are formed.

A polyethylene terephthalate fiber product, formed into a web structure as described above has been identified under the registered trademark "Reemay" by the E. I. du Pont de Nemours and Company, Incorporated of Wilmington, Del. Presently, the Reemay® web structure is available in various thicknesses and densities from Reemay, Inc. of Old Hickory, Tenn. The properties of Reemay tapes are further defined and described in Bulletin R-1, dated March, 1986, entitled "Properties and Processing of Reemay Spunbonded Polyester" from E. I. du Pont de Nemours and Company, Incorporated, Wilmington, Del.

Although in a preferred embodiment, a spunbonded polyester tape is used, others also are acceptable. For example, the tape which is to be impregnated may be a nylon spunbonded fabric, non-woven glass, polypropylene melt blown non-woven fabric, polyurethane spunbonded fabric or TCF cellulose fabric, for example.

Advantageously, the tape 30 of this invention also acts as a thermal barrier not only during the extrusion of the core tube 28 but also during the extrusion of the jacket 38. As the jacket 38 is extruded over the shield 34, heat is available for transfer into the optical fiber core. The tape 30 of the cable 20 has the ability to insulate against the heat caused by the extrusion of the core tube and the jacket.

Another important characteristic of the substrate tape is the stiffness of the body of the material which comprises the tape. Within limits, as the material of the substrate tape is made increasingly stiffer, it is still relatively easy to form the tape longitudinally about the units 24—24, without wrinkling. However, it is important that the material have sufficient memory so that it tends to spring outwardly into engagement with the inner surface of the core tube 28. As a desirable consequence, a minimum overall diameter is achieved for the cable which will meet all the necessary requirements. Stiffness of the material for the substrate tape is controlled by a combination of factors such as the number of fibers per unit volume, thickness of the material, size of the fibers and the amount and type of binder used in the material. Increasing the thickness of the material obviously increases the cost of the material per unit of surface area of cable covered. Increasing the number of the fibers per unit volume or increasing the amount of binder tends to increase the ability of the material to delay heat transfer. At least four factors, formability of the tape 30, cost of the tape, insulative capability of the tape, and its waterblocking capability must be considered and balanced in providing the proper material for use in a particular cable.

In one embodiment, the spunbonded polyester tape combines the thermal, chemical and mechanical properties of polyester fibers with a spunbonded structure to provide a tape which is suitable for use in a communications cable. These properties include a relatively high tensile strength and elongation, excellent tear strength, and resistance to temperatures which might be expected in a burning building and which may reach values as high as about 2000° F.

The waterblocking member 26 includes provisions for blocking the flow of water longitudinally along the cable core and for preventing the freezing of water. In one embodiment, the tape 30 is treated with a water soluble material or a mixture of water soluble materials which prevents freezing of water which may enter the cable and reach the core. Preferably, the tape is treated with propylene glycol. Other materials which are suitable as an antifreeze constituent include ethylene glycol, dimethyl sulfoxide and sodium or potassium chloride, sulfate and acetate. The latter material is used presently in powder form as a deicer on roads. A typical loading of propylene glycol on a Reemay tape is on the order of about 0.008 grams/sq. ft.

Then two substrates tapes each having been treated with an antifreeze material are laminated with a superabsorbent material therebetween. Superabsorbents are hydrophilic materials which can absorb and retain water without dissolution in the fluid being absorbed. See J. C. Djock and R. E. Klern "Review of Synthetic and Starch-Graft Copolymer Superabsorbents" prepared for the Absorbent Products Conference held Nov. 16-17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent discloses saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the non-electrolytes. The polyelectrolytes are the most important and fall into several classes. Of these, the polyacrylic acid-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate salts. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

Figure 3:
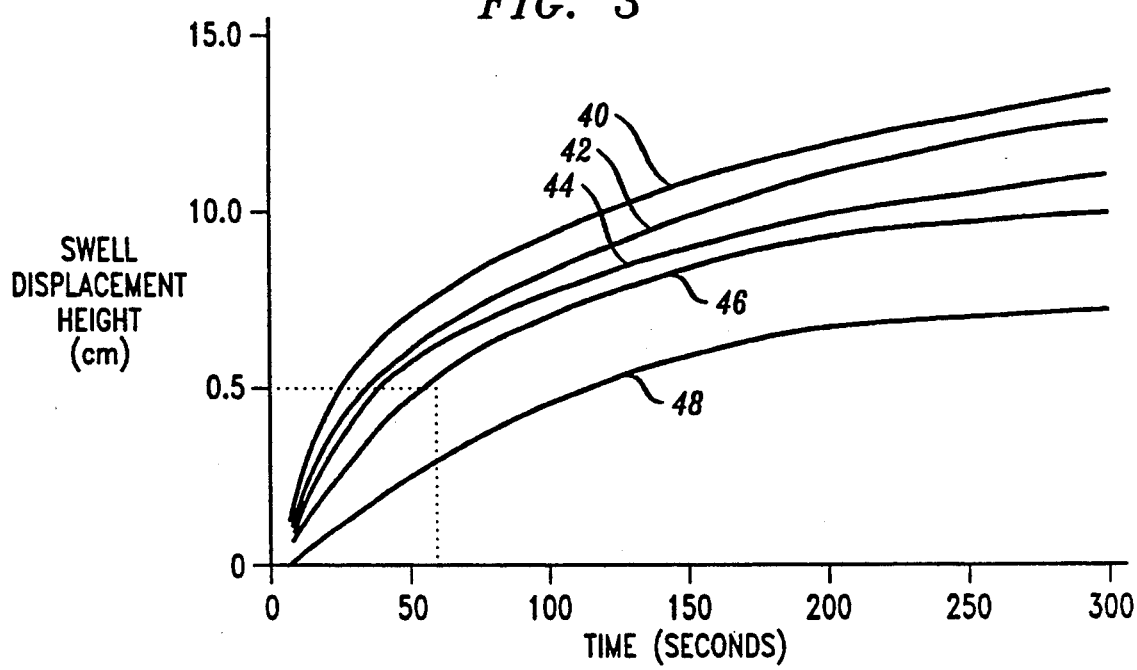
FIG. 3 is a graph which depicts swellability test results for a particular antifreeze material.

In FIG. 3 are shown swellability test results for a plurality of waterblocking members, each comprising two substrate tapes, all except one having been treated with a mixture of distilled water and propylene glycol with a superabsorbent powder laminated therebetween. A suitable superabsorbent powder which may be laminated between two coated Reemay tapes is one marketed by the Stockhausen Company under the designation Stockhausen FAVOR SAB 800 HS powder. The curve designated 40 depicts results when the tapes have not been treated with propylene glycol. The curves 42–48 depict results for tapes treated with mixtures of 4:1, 3:1, 2:1, and 1:1, respectively, of distilled water and propylene glycol.

Following are examples of the amount of antifreeze material required to lower the freezing point of one gram of water to −40° C.

| Antifreeze | Amount (Grams) |
|---|---|
| Ethylene glycol | 1.335 |
| Propylene glycol | 1.637 |

Different amounts may be used to lower the freezing point to a temperature different than −40° C.

Tests were conducted to determine if tapes which included antifreeze constituents as well as superabsorbent material met minimum swell height requirements of 0.5 cm in 60 seconds. As can be seen in FIG. 3, maximum swell height was achieved with a laminated tape having superabsorbent powder only between two substrate tapes. However, although each of tapes which included superabsorbent and antifreeze materials achieved less swell height than that of the tape which included superabsorbent only, all but the 1:1 mixture meets the minimum swell height requirements of 0.5 cm in 60 seconds.

In an alternate embodiment, the waterblocking member 26 comprises two tapes 30—30 each impregnated with a superabsorbent material. An antifreeze material in powder form is laminated between the two tapes 30—30.

In another alternative embodiment, the waterblocking member 26 comprises a tape 30 which has been impregnated with a superabsorbent material and with an antifreeze material. Of course, the waterblocking member 26 may be a laminate comprising one tape 30 which has been impregnated with a superabsorbent material and another tape which has impregnated with a superabsorbent material and another tape which has been impregnated with an antifreeze material.

In still another alternate embodiment, a laminate comprises two substrate tapes each being a non-woven polyester material with a powder mixture therebetween. The powder mixture comprises a mixture of an antifreeze material and a superabsorbent material. For maximum swelling, a 4:1 ratio of superabsorbent material to antifreeze material is used. Hence, for each 1.637 grams of propylene glycol used to lower the freezing point of one gram of water to −40° C., about 6.4 grams of the superabsorbent powder is mixed therewith.

It also becomes important that the introduction of the antifreeze provisions presents no added loss into the cable beyond acceptable limits. It has been shown that for tapes treated with ethylene glycol or propylene glycol with a superabsorbent polymer therebetween, the added losses are within acceptable limits.

Each of the tapes also may be provided with resistance to microbial growth. Non-cellulosic tapes are used and the superabsorbent materials are microbial resistant. See application Ser. No. 07/709,061 filed on May 30, 1991, now U.S. Pat. No. 5,138,061, in the name of C. J. Arroyo which is a continuation of application Ser. No. 07/468,559 filed on Jan. 23, 1990, now abandoned, and which is incorporated by reference hereinto.

Although the tapes thus far have been polyester nonwoven tapes, it also is possible to laminate between two tapes which are wood pulp derivatives. These perform equally as well as the others described except that fungus growth is experienced. In order to deal with the fungus growth, such cellulosic tapes are treated with antimicrobial resistant material such as Intersept antimicrobial resistant material as marketed by Interface Research Corporation or TK100 material which is marketed by Calgon Corporation.

As mentioned in the Background of the Invention, it becomes desirable to be able to extend a cable from a manhole into a building and up a riser shaft. Such a cable not only must include waterblocking and antifreeze provisions for the outside portion of the use but also must have sufficiently low flame retardance and smoke generation properties. Desirably, the cables of this invention include waterblocking and antifreeze materials, insulation and jacketing materials, such as polyvinyl chloride, for example, which result in passage of Underwriters Laboratories test UL 1666 for riser cable. In each sample tested, the flame height was substantially less than the allowable 336 cm over a one minute time duration.

Figure 4:
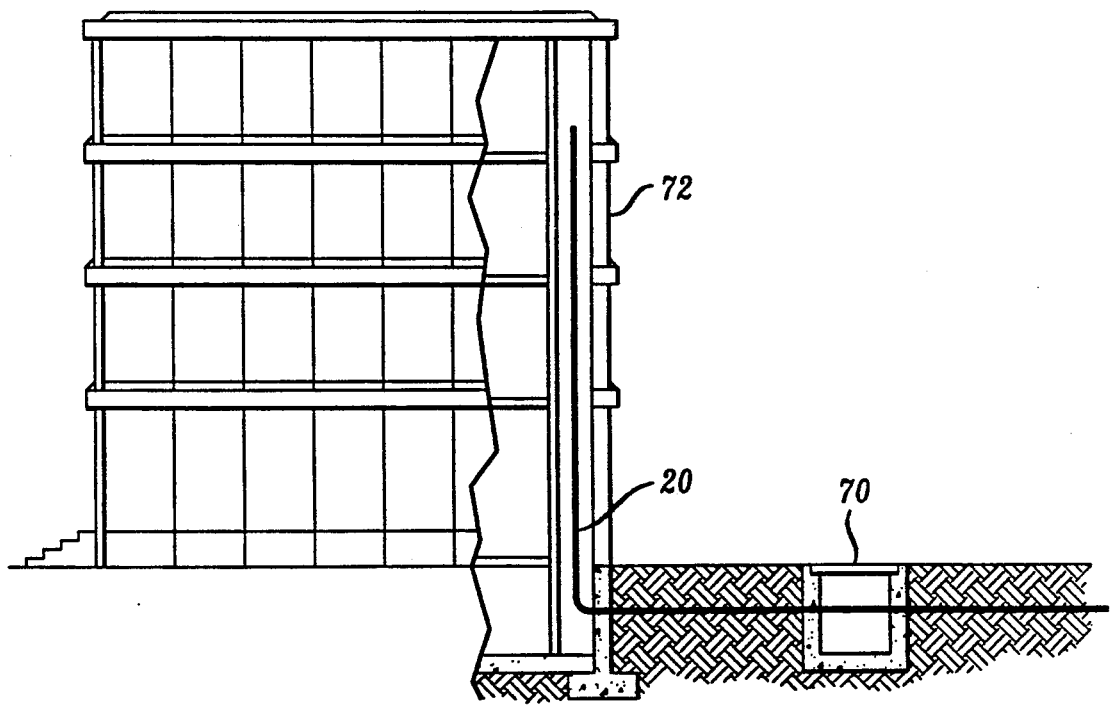
FIG. 4 is a schematic view of a cable extending from a manhole into a building.

As a result of the cable 20 having antifreeze and waterblocking capabilities, the spectrum of use of the cable has been widened. As can be seen in FIG. 4, the cable 20 may extend from an outside manhole 70 into a building 72 and up a riser shaft.

Figure 5:
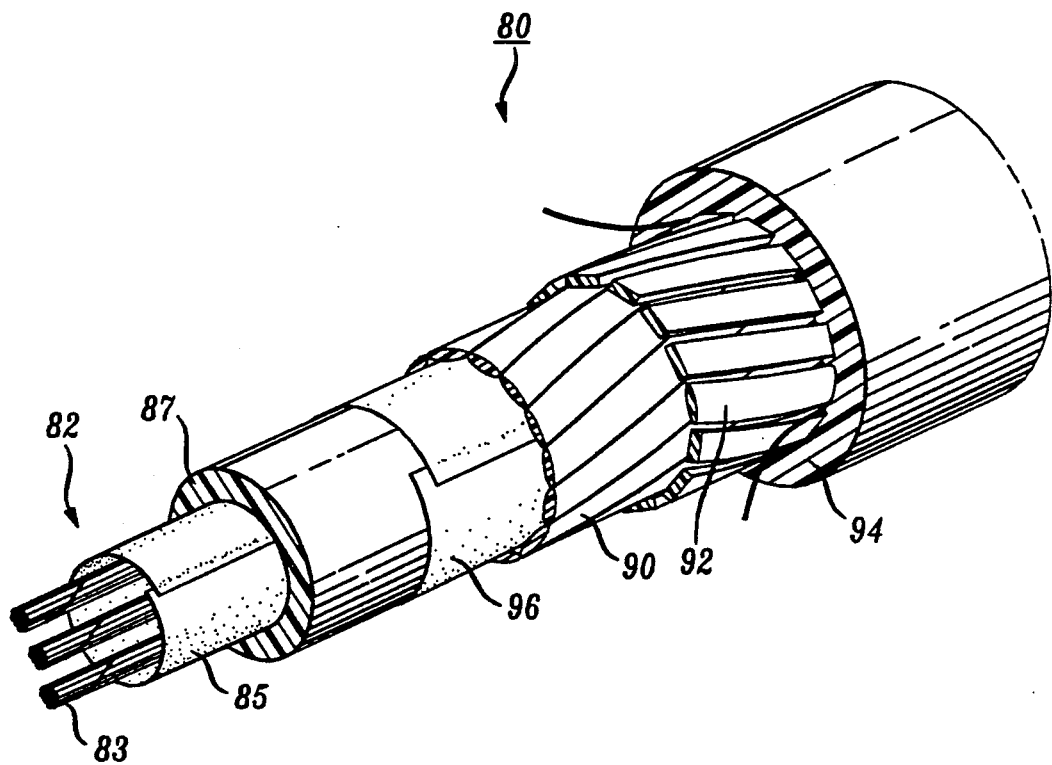
FIG. 5 is a perspective view of another cable of this invention.

In another embodiment shown in FIG. 5, a cable 80 which is suitable for installation between a manhole and a distribution point within a building includes a core 82 comprising a plurality of optical fibers 83—83 which may be in ribbon form (not shown) and a laminate 85. The laminate 85 comprises two tapes each impregnated with a superabsorbent material and with a superabsorbent powder between the two tapes. In the alternative, a mixture of a superabsorbent powder and an antifreeze material is laminated between two tapes. Enclosing the foregoing is a tubular member 87. About the tubular member 87 is disposed a strength member system which includes an inner layer 90 comprising relatively flexible rovings and an outer layer 92 comprising at least some rod-like strength members. A jacket 94 made of a plastic material which is flame retardant is disposed about the strength member system. A tape 96 which has been treated or laminated to include only a waterblocking function may be interposed between the tubular member 87 and the strength member system.

It is to be understood that the above-described arrangements are simply illustrative of the invention. Other arrangements may be devised by those skilled in the art which will embody the principles of the invention and fall within the spirit and scope thereof.

We claim:

1. An optical fiber cable, which includes:
   a core comprising at least one optical fiber transmission medium;
   a tubular member in which is disposed said core and which is made of a plastic material;
   a sheath system which is disposed about said tubular member; and
   means disposed within said tubular member for blocking the longitudinal flow of water and for preventing freezing of water within said cable, said means including a superabsorbent material and an antifreeze material, the weight ratio of said antifreeze material to the superabsorbent material is in the range of about 1:1 to about 1:4.

2. The cable of claim 1, wherein said means includes a mixture of the superabsorbent material and the antifreeze material.

3. The cable of claim 1, wherein said antifreeze material is selected from the group consisting of a water soluble material and a mixture of water soluble materials.

4. The cable of claim 3, wherein said antifreeze material is selected from the group consisting of propylene glycol and ethylene glycol.

5. The cable of claim 4, wherein said antifreeze material comprises propylene glycol.

6. The cable of claim 4, wherein said antifreeze material comprises ethylene glycol.

7. The cable of claim 3, wherein said antifreeze material comprises dimethyl sulfoxide.

8. The cable of claim 3, wherein said antifreeze material is selected from the group consisting of soluble sodium and potassium salts.

9. The cable of claim 1, wherein materials of said cable are such as to cause said cable to have suitable resistance to flame and smoke spread.

10. The cable of claim 1, wherein said means includes a longitudinally extending laminate comprising two substrate tapes having a powder mixture therebetween.

11. The cable of claim 10, wherein said powder mixture includes a mixture of the superabsorbent material and an antifreeze material.

12. The cable of claim 11, wherein said antifreeze material is a soluble material which sufficiently increases the ionic strength of absorbed water to reduce the freezing point thereof.

13. The cable of claim 1, wherein said means includes a longitudinally extending laminate comprising two substrate tapes each having been treated with an antifreeze material with a superabsorbent material being disposed between said tapes.

14. The cable of claim 1, wherein said means includes a longitudinally extending laminate comprising two substrate tapes each having been treated with a superabsorbent material with an antifreeze material being disposed between said tapes.

15. The cable of claim 1, wherein said means includes a longitudinal extending tape which has been impregnated with a mixture of an antifreeze material and a superabsorbent material.

16. The cable of claim 1, wherein said means includes one tape which has been impregnated with a superabsorbent material and which is laminated to another tape which has been impregnated with an antifreeze material.

17. The cable of claim 1, wherein said superabsorbent material is microbial resistant.

18. The cable of claim 1, wherein said means comprises two longitudinally extending tapes, each comprising a non-cellulosic material.

19. The cable of claim 1, wherein said means comprises two longitudinally extending cellulosic based tapes, each having been treated with a microbial resistant material.

* * * * *